UNITED STATES PATENT OFFICE.

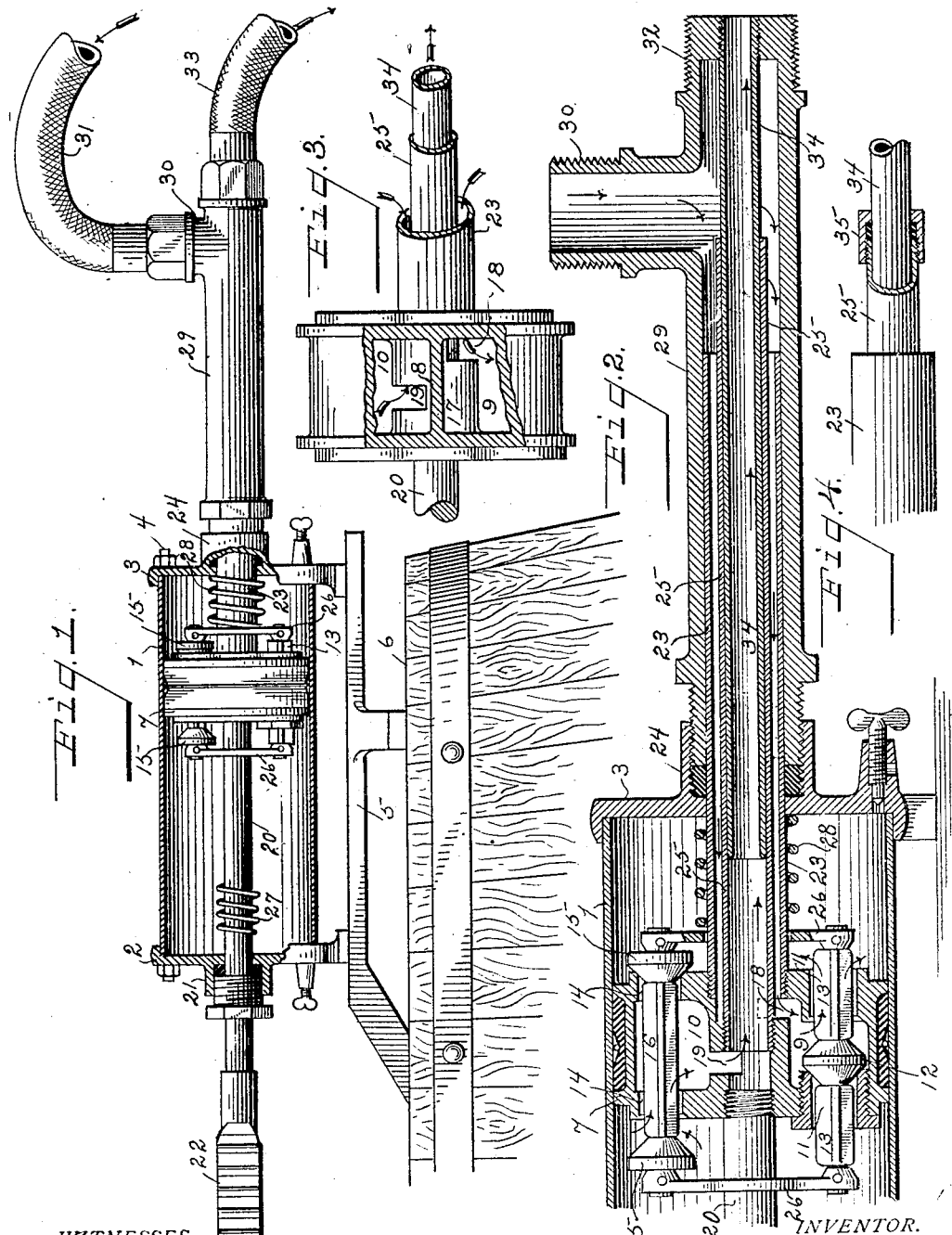

HARRY C. DAVIDSON, OF SPRINGFIELD, OHIO, ASSIGNOR, BY MESNE ASSIGNMENTS, TO THE COFFIELD MOTOR WASHER CO., OF DAYTON, OHIO, A CORPORATION OF OHIO.

WATER-MOTOR.

No. 926,644.
Specification of Letters Patent.
Patented June 29, 1909.

Application filed July 18, 1907. Serial No. 384,345.

*To all whom it may concern:*

Be it known that I, HARRY C. DAVIDSON, a citizen of the United States, and a resident of Springfield, in the county of Clark and State of Ohio, have invented certain new and useful Improvements in Water-Motors, of which the following is a specification.

My invention relates to water motors and particularly to reciprocating motors adapted to operate washing machines, churns, ice cream freezers and other light machinery.

The object of the invention is to simplify the structure as well as the means and mode of operation of such machines whereby they will not only be cheapened in construction, but will be rendered more compact and more efficient in operation and unlikely to get out of repair.

It is usual to attach the actuating motor to the hinged cover of the washing machine, churn or other receptacle and to supply the water through a hose connection from an adjacent faucet, the waste being discharged into a sink beneath the supply faucet. For this reason it is desirable that the inlet and outlet connections to the motor be adjacent to each other and further located at a point removed from the driving connections of the motor in order that the inlet and outlet hose connections may not interfere with the opening of the washer, or otherwise interfere with the operating parts of the motor. It is further desirable that the respective hose connections be stationary, to prevent wear and entanglement of the hose. The achievement of the above mentioned features are further objects of the invention, as is also an improved means of simultaneously operating the respective inlet and outlet piston valves at the limit of the piston stroke.

With the above primary and other incidental objects in view, as will appear from the specification, the invention consists of the means, mechanism, construction and mode of operation hereinafter described and set forth in the claims, or their equivalents.

In the drawings, Figure 1 is a side elevation partly broken away of the assembled motor. Fig. 2 is a longitudinal sectional view of a portion of the motor. Fig. 3 is a side view partly broken away of the piston with valves removed. Fig. 4 is a detail view of a modification showing the use of a stuffing box on the discharge pipes.

Like parts are indicated by similar characters of reference throughout the several views.

Referring to the drawings, 1 is the cylinder provided with heads 2—3 connected by suitable tie bolts 4 in the usual manner.

In Fig. 1 the motor is shown as secured to a base 5 which in turn is mounted on the lid of the washer indicated at 6.

Within the cylinder 1 is a reciprocating piston 7 divided by a partition wall 8 into two non-connecting chambers; an inlet chamber 9 and an exhaust chamber 10. Ports or valve openings 11 enter the inlet chamber 9 from opposite sides of the piston. Mounted within the chamber 9 is a valve 12 adapted to alternately close the openings 11, and provided with oppositely disposed stems 13 extending outward through the openings 11 beyond the faces of the piston. The valve 12 is adapted to seat against the inner side of the ports 11, closing one port and opening the other alternately as the piston reaches the ends of its stroke, in opposite directions.

Ports 14—14 enter the exhaust chamber 10 from opposite sides of the piston. Said ports are controlled by valves 15—15 arranged on a common stem 16 and adapted to seat against the outer sides of said piston. The valves 15—15 are so spaced on the stem that when one port is closed the oppposite port is open, the valves alternating open and closed positions at the ends of the piston stroke.

The piston is provided with a hub or core 17 having a central bore. Slots or ports 18—19 connect said central bore with the respective inlet and exhaust chambers for the purpose hereinafter mentioned. A piston rod 20 is attached to the piston 7 and extends through a suitable stuffing box 21 in the head 2 and may be provided with a rack 22 to engage with a driven pinion or may connect to a crank as desired. The piston rod 20 is preferably solid and by screwing therein closes one end of the central bore of the piston. An inlet pipe 23 engages the opposite end of the central bore of the piston, and extends outward through a stuffing box 24 in the head 3. An outlet pipe 25 extends centrally through the inlet pipe 23 and is screw threaded into a reduced portion of the central bore of the piston as shown in Fig. 2.

Yokes 26 on either side of the piston connect with the respective stems of the inlet and outlet valves, and cause said valves to seat in unison. Helical springs 27—28, preferably of equal diameter throughout are located about the piston rod 20 and the inlet pipe 23 respectively, intermediate the respective yokes and corresponding cylinder heads.

The springs 27—28 might be attached to either the yoke or to the cylinder head, but are preferably independent of either and loose on the pipe and rod. By this construction as the piston approaches the limit of its stroke, the yoke contacts with the corresponding spring. The spring bearing against the cylinder head resists the further movement of the piston, bearing on the central part yoke intermediate the valve stems.

The yoke acting over the spring as a lever on a fulcrum will tend to equalize the force on the respective valve stems, or distribute the resistance, whereby one set of valves will not be caused to seat in advance of the other as may be the case when the respective valve stems are operated independently by independent contact with springs or the cylinder head.

Upon the contact of the yoke 26 with the corresponding spring the water pressure will cause the yoke to bear upon the spring until the pressure of the yoke upon the spring is sufficient to overcome the inertia or resistance of the valves, and the valves will be shifted to close the open ports, and open those previously closed, whereby the water pressure will be admitted to the opposite side of the piston and the movement thereof reversed. The spring not only forms a fulcrum on which the yoke 26 will teeter as before described, to equalize the movement of the valves but will also form a yielding buffer, which will relieve the jar incident to the contact of the piston.

One of the objects of the construction just described and advantages resulting therefrom is that the valves are operated to instantly and completely cut off the water supply at the limit of the piston stroke.

Extending from the cylinder head 3, preferably having its inner end forming the gland of the stuffing box 24, is an extended hollow casing 29, having thereon a screw threaded connection 30 for the water supply conduit 31, and a similar connection 32 for the exhaust conduit 33.

The water supply pipe 23 before described extends from the piston through the stuffing box 24 into the casing 29, telescoping therewith and preferably having a sliding fit within said casing. The water outlet pipe 25 extends through said inlet pipe and telescopes with a pipe 34 secured within the case 29. The pipe 34 is stationary while the pipes 23 and 25 reciprocate within the case 29. The outlet pipe preferably extends beyond the end of the pipe 23 and surrounds the pipe 33. However, the results would not be different if the pipe 25 was shorter than the pipe 23 or arranged to telescope within the pipe 34.

On account of the great overlapping length of the pipes 25 and 34 it has been found in practice that a stuffing box to prevent the leakage of water in either direction intermediate the walls of said pipes is unnecessary. However, if through irregularity of the tubing forming said pipes or by improper fitting of the respective pipes leakage should occur, a stuffing box 35 may be provided as in Fig. 4 which is screw-threaded on the extremity of the pipe 25 and provided with packing 36.

The operation of the device is as follows: The water entering under pressure through the supply conduit 31 into the casing 29 passes through the inlet pipe 23 and port 18 into the inlet chamber 9. In the Figs. 1 and 2 of the drawings, the piston is shown as just beginning its stroke to the left the respective valves having been operated to open the right inlet port and the left exhaust port by the contact of the yoke with the spring 28 as described.

The water from the chamber 9 is flowing as indicated in Fig. 2 through the inlet port 11 into the cylinder space at the right of the piston driving said piston to the left. At the same time the spent water to the left of the piston is entering through the left port 14 into the exhaust chamber 10 passing thence through the port 19 and the outlet pipes 25 and 34 to the exhaust conduit 33. At the limit of the piston stroke to the left the yoke 26 in advance of the piston will engage at its central part the spring 27. The continued movement of the piston will, by the pressure upon or resistance of the spring, move the respective valves to an alternate relation of open and closed ports when the piston will travel to the right, under the influence of the water under pressure delivered to the left side of the piston by the said reversal of the valves.

In Fig. 1 is shown the relation of the motor with the tub, washer, churn, ice cream freezer, or other receptacle, with the casing 29 projecting well beyond the periphery of the receptacle and the supply and exhaust conduits stationarily located beyond possible interference with the operating parts of the motor or with the cover of the receptacle when open. While the device has been described as a water motor, it is not limited to such use but other actuating media may be utilized.

From the above description it is apparent that there is thus produced a motor possessing the particular features of advantage before enumerated as desirable, but which obviously is susceptible of modification in its form, proportion, detail construction, and arrangement of parts, also in its application and use of actuating media without departing from the principle involved or sacrificing any of its advantages.

Having thus described my invention, I claim:

1. In a water motor, a cylinder, a piston therein, said piston being divided into non-communicating chambers, inlet and outlet valves in said piston controlling the flow of fluid to and from said cylinder, concentric inlet and outlet pipes on the same side of said piston communicating with the respective chambers of the piston, said inlet and outlet pipes being each formed in two telescoping sections, the inner sections of said pipes being movable with the piston, the outer sections remaining at rest, and stationary supply and outlet connections on said outer sections remaining stationary, substantially as specified.

2. In a water motor, a cylinder, a piston therein divided into non-communicating chambers, valves in the respective chambers controlling the fluid flow to and from said cylinder, in combination with an auxiliary casing attached to one head of said cylinder concentric inlet and outlet pipes communicating with the respective piston chambers and projecting within said casing, a stationary pipe supported within said casing and telescoping with the inner most pipe of said concentric inlet and outlet pipes and stationary inlet and exhaust conduit connections communicating with said casing and stationary pipe, substantially as specified.

3. In a motor as described, a cylinder, a piston, valves in said piston controlling the fluid flow to and from said cylinder, inlet and outlet pipes projecting from the same side of said piston and communicating with the respective piston valves, a casing projecting from said cylinder with which one of said pipes telescopes, a stationary pipe secured within said casing with which the other of said pipes telescopes, and supply and exhaust conduit connections communicating with the respective pipes, substantially as specified.

4. In a device as described, the combination with a tub or other receptacle, of a motor comprising a cylinder, a piston therein divided into non-communicating chambers, inlet and outlet valves in said piston head controlling the flow of fluid to and from the cylinder, a projecting casing on said motor, extending beyond the periphery of the receptacle, and provided with inlet and outlet passages communicating with the chambers of said piston, stationary supply and exhaust conduit connections adjacently located on said projecting casing, whereby the supply and exhaust conduits will be removed from the operating parts of the motor, and from the receptacle or work, and adjacently located that the supply may be from an ordinary faucet, and the exhaust discharge into the basin beneath same, substantially as specified.

In testimony whereof, I have set my hand hereunto this 15th day of July 1907.

HARRY C. DAVIDSON.

Witnesses:
GEORGE W. TEHAN,
W. W. WITMEYER.